United States Patent
Cunningham et al.

(10) Patent No.: US 9,413,781 B2
(45) Date of Patent: Aug. 9, 2016

(54) SYSTEM AND METHOD EMPLOYING STRUCTURED INTELLIGENCE TO VERIFY AND CONTAIN THREATS AT ENDPOINTS

(71) Applicant: FireEye, Inc., Milpitas, CA (US)

(72) Inventors: Sean Cunningham, Washington, DC (US); Robert Dana, Springfield, VA (US); Joseph Nardone, Arlington, VA (US); Joseph Faber, Round Hill, VA (US); Kevin Arunski, Sterling, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/216,453

(22) Filed: Mar. 17, 2014

(65) Prior Publication Data
US 2014/0344926 A1 Nov. 20, 2014

Related U.S. Application Data

(60) Provisional application No. 61/800,796, filed on Mar. 15, 2013.

(51) Int. Cl.
*G06F 11/00* (2006.01)
*H04L 29/06* (2006.01)
*G06F 21/55* (2013.01)

(52) U.S. Cl.
CPC .......... *H04L 63/1441* (2013.01); *G06F 21/554* (2013.01); *H04L 29/06877* (2013.01); *H04L 29/06884* (2013.01); *H04L 63/14* (2013.01); *H04L 63/1408* (2013.01)

(58) Field of Classification Search
CPC ...................... H04L 63/1441; H04L 29/06877; H04L 29/06884; H04L 63/14; H04L 63/1408; G06F 21/554
IPC ................................................... H04L 63/1441
See application file for complete search history.

(56) References Cited

U.S. PATENT DOCUMENTS

| 7,472,418 | B1 * | 12/2008 | McCorkendale et al. | 726/24 |
|---|---|---|---|---|
| 7,886,065 | B1 * | 2/2011 | Satish et al. | 709/229 |
| 8,042,182 | B2 * | 10/2011 | Milani Comparetti et al. | 726/23 |
| 8,136,149 | B2 * | 3/2012 | Freund | 726/11 |
| 8,826,424 | B2 * | 9/2014 | Lyne et al. | 726/22 |
| 2007/0123214 | A1 * | 5/2007 | Mock | 455/410 |
| 2009/0165135 | A1 | 6/2009 | Lomont et al. | |

(Continued)

FOREIGN PATENT DOCUMENTS

| JP | 2011-053893 A | 3/2011 |
|---|---|---|
| KR | 10-1132197 B1 | 4/2012 |

OTHER PUBLICATIONS

International Search Report corresponding to PCT/US2014/030633 and dated Aug. 5, 2014.

*Primary Examiner* — Krisna Lim

(57) ABSTRACT

A system and method to detect and contain threatening executable code by employing a threat monitor, verifier, endpoint agent, and a security information and event management module. The system and method are a departure from and an improvement over conventional systems in that, among other things, the system and method allow an investigator to determine whether a threat has persisted or executed, and allow that information to be communicated back to the detection mechanism (or other system) such that a user (or machine) may make a decision to take further action such as to contain the threat quickly and/or permit the system to do so automatically.

43 Claims, 4 Drawing Sheets

(56) References Cited

U.S. PATENT DOCUMENTS

| | | |
|---|---|---|
| 2012/0185936 A1 | 7/2012 | Lakshminarayanan |
| 2012/0278890 A1 | 11/2012 | Matta et al. |
| 2013/0333040 A1* | 12/2013 | Diehl et al. .................... 726/24 |
| 2014/0059668 A1* | 2/2014 | Holloway et al. ............... 726/12 |

* cited by examiner

SYSTEM AND METHOD EMPLOYING STRUCTURED INTELLIGENCE TO VERIFY AND CONTAIN THREATS AT ENDPOINTS

CROSS-REFERENCE TO RELATED APPLICATION

This patent application claims priority to U.S. Provisional Patent Application Ser. No. 61/800,796 titled System and Method Employing Structured Intelligence to Verify and Contain Threats at Endpoints, and filed Mar. 15, 2013, the entire contents of which is incorporated herein by reference.

BACKGROUND

1. Field

The present inventive concept relates to a system and method to detect and contain threatening executable code. More specifically, an embodiment of the present inventive concept relates to a system and method operable to improve identification and containment of threatening software across a plurality of endpoints.

2. Discussion of Related Art

Systems currently exist to detect executable code as it passes over a network. These systems employ a variety of methods of detection, including analyzing traffic at various protocol and application layers as well as analyzing common application artifacts such as email messages. These systems can analyze executable code using a variety of methods to extract information about the code's behavior. Existing systems use the extracted information to classify the code as benign or a potential threat.

While such existing systems may be effective at identifying threats represented by executable code in network traffic, they are not suitable to identify devices or users that may have been exposed to the threat. For example, existing systems and methods cannot conclusively determine if a threat or piece of code has reached a device on which it could be executed or, once such a threat or piece of code has reached such a device, whether or not it has actually executed.

Further, analysis of information and data traffic and application artifacts, and generation of information therefrom, takes time. During the process of analysis, there is a risk that a threatening piece of code may be transmitted to, received by, and potentially executed on a device. Even if a security investigator using existing systems can successfully determine that a threat has landed or executed, intervention against the threat using existing systems and methods must be performed manually or by channels outside the normal network, sometimes requiring physical access to the device, thus further extending the time between initiating analysis and effectively reacting to discovery of a threat. During the time it takes to implement existing systems and methods to detect, control or contain threatening software, such threatening software may be allowed to further its malicious functions.

Thus, there is a need for a system and method that provides improved detection, verification, tracking and reaction to threatening software.

SUMMARY

Embodiments of the present inventive concept described herein remedy the aforementioned problems by providing a unique system and method operable to detect and contain threatening executable code.

Embodiments of the present inventive concept include software installed at an "endpoint", that is, at a device, such as a computer or mobile device, including a processor that is configured to communicate with a network, that is to be monitored and/or audited according to embodiments of the present inventive concept. Endpoints may illustratively include, e.g., client/server desktop computers, laptop/notebook computers, process controllers, medical devices, data acquisition devices, mobile devices such as smartphones and tablet computers, intermediate network devices and nodes such as network servers, and/or any other intelligent electronic device having network connectivity that may be configured to implement an endpoint agent. The endpoint agent(s) allow gathering of data and information relating to a network and its contents and components by utilizing audit modules to examine endpoints for evidence they have been exposed to a given threat, and to determine whether that threat (most commonly, executable code) has executed or otherwise been realized.

An endpoint agent may be installed locally at an endpoint or elsewhere so long as it is capable of accessing system information and memory of, and of auditing, the endpoint to which it is assigned. Utilizing software configured to monitor, and that is preferably installed on, endpoints means being present and persistent for extended timeframes and providing consistent and persistent monitoring and analysis. This allows embodiments of the system of the present inventive concept to record historical information about system state at endpoints, especially information relevant to common threat mechanisms, such that the information may be used to detect threats after they have landed, executed, and even taken action to hide their presence.

The endpoint agent(s) may then communicate information back to the original detecting and coordinating parts of the system as well as to any other appropriately-configured security software or platforms. The endpoint agent thus may enable a user, or an automated component of the system in certain embodiments, to take action against a threat on the endpoint(s), including by using the endpoint agent(s) to contain the threat. This containment strategy is unique, including because it is in response to a threat verified using present and historical data, and retains the ability to contact, monitor, remediate and ultimately lift containment on the affected endpoint while limiting the threat's ability to communicate.

The system and method of the present inventive concept are a departure from and an improvement over conventional systems in that, among other things, the system and method of the present inventive concept allows an investigator to determine whether a threat has persisted or executed. It allows that information to be communicated back to the detection mechanism (or other system) such that a user (or machine) may make a decision to take further action such as to contain the threat quickly and/or permit the system to do so automatically. All of this may take place in a matter of seconds, minutes, or hours.

These and other goals of the present inventive concept may be achieved by providing a method to identify potentially malicious code at an endpoint, e.g., a first endpoint among one or more endpoints, in a network. The method may include the step of using a threat monitor to monitor network data and extract a set of network data therefrom that includes "threat intelligence" or just "intelligence," which is any information exchanged or residing within the system network that may have strategic importance for detecting, tracking or analyzing a present or past threat. The threat monitor may employ a network monitor more specifically to monitor the network. That set of network data commonly includes executable code, and is processed to generate a report, which may be in the form of structured data and information. The set of network data may be processed using an analyzer of the threat monitor, for example a static or a dynamic analyzer.

A verifier including an agent coordinator may receive the report, and based thereon issue (i) instructions and/or (ii) indicators to an endpoint agent. Instructions may tell an agent to perform or not to perform certain actions and may comprise executable code or other instructions in a format that may be acted on by the endpoint agent. Indicators are pieces of information, such as logical "if-then" tests, data ranges, and other types of information, that may be used for comparison with information that resides on or is accessible to the endpoint or for configuring an audit to be performed on the endpoint. The endpoint agent may then process the (i) instructions and/or (ii) indicators to generate verification information.

In a preferred embodiment, the endpoint agent process may include one or more additional steps, after it takes in or receives instructions and/or indicators. The instructions and indicators may first pass to an audit controller that may control and configure tasking for an audit module of the endpoint agent. The audit module may retrieve, consolidate, and/or index information residing on or retrievable by the endpoint. It may do so intermittently or continuously pursuant to pre-programmed instructions automatically executed within the system and/or as prompted by additional requests from the audit controller, such as in response to a set of instructions and/or indicators from the verifier. The audit module may also form part of a persistent monitor, which also includes a buffered storage module for controlling storage of audit data created by an audit module.

Once the audit controller has provided instructions and/or indicators to the audit module, the audit module may perform an inspection of data and information residing on or accessible to the endpoint, and may further inspect its own records and audit data stored by the endpoint agent, and create resulting audit data. The audit data may then be passed to the buffered storage module for storage under conditions that may be pre-determined or that may vary with instructions provided by other components of the system or based on computer learning and/or system variances and needs. The audit data may then pass to an indicator matcher, which may or may not have been configured by the audit controller for example based on the instructions and/or indicators which prompted the audit being evaluated, and the indicator matcher may then process the audit data, including any hit candidates, to create recommendations to the audit controller on certain audit data that should be packaged up for transmission as verification information to be exported from the endpoint agent. In simpler embodiments, the audit data itself may be directly passed out of the endpoint agent as the verification information.

Still further, the verification information may be passed from the endpoint agent to the verifier, and processed by the verifier to determine whether the verification information indicates a verified threat. In performing this processing, the verification information may be compared against one or both of data obtained from another endpoint and data obtained from a security information and event management module (SIEM). The verification information, and possibly information regarding whether it represents a verified threat, may also be passed to the SIEM and/or the threat monitor. The method may further include changing the configuration and/or settings of the threat monitor based on the verification information.

Yet still further, the method may include steps for performing a containment action based on the verification information. A "containment action" is an action, for example changing or providing instructions to change endpoint system permissions, settings, communication patterns, execution priorities, memory allocations and similar properties, and is intended to effect the operation or disposition of potentially malicious software and/or information or data related to the potentially malicious software. In a preferred embodiment, after the verifier processes verification information and determines that there is verified threat information from the endpoint, the agent controller of the verifier configures a containment package including instructions for containment actions to be taken and/or executable code for an additional module which may be installed as part of the endpoint agent and which may undertake certain containment actions (a "containment agent").

Additional aspects, advantages, and utilities of the present inventive concept will be set forth in part in the description which follows and, in part, will be obvious from the description, or may be learned by practice of embodiments of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

Embodiments of the present inventive concept are described in detail below with reference to the attached drawing figures, wherein.

Figure 1:
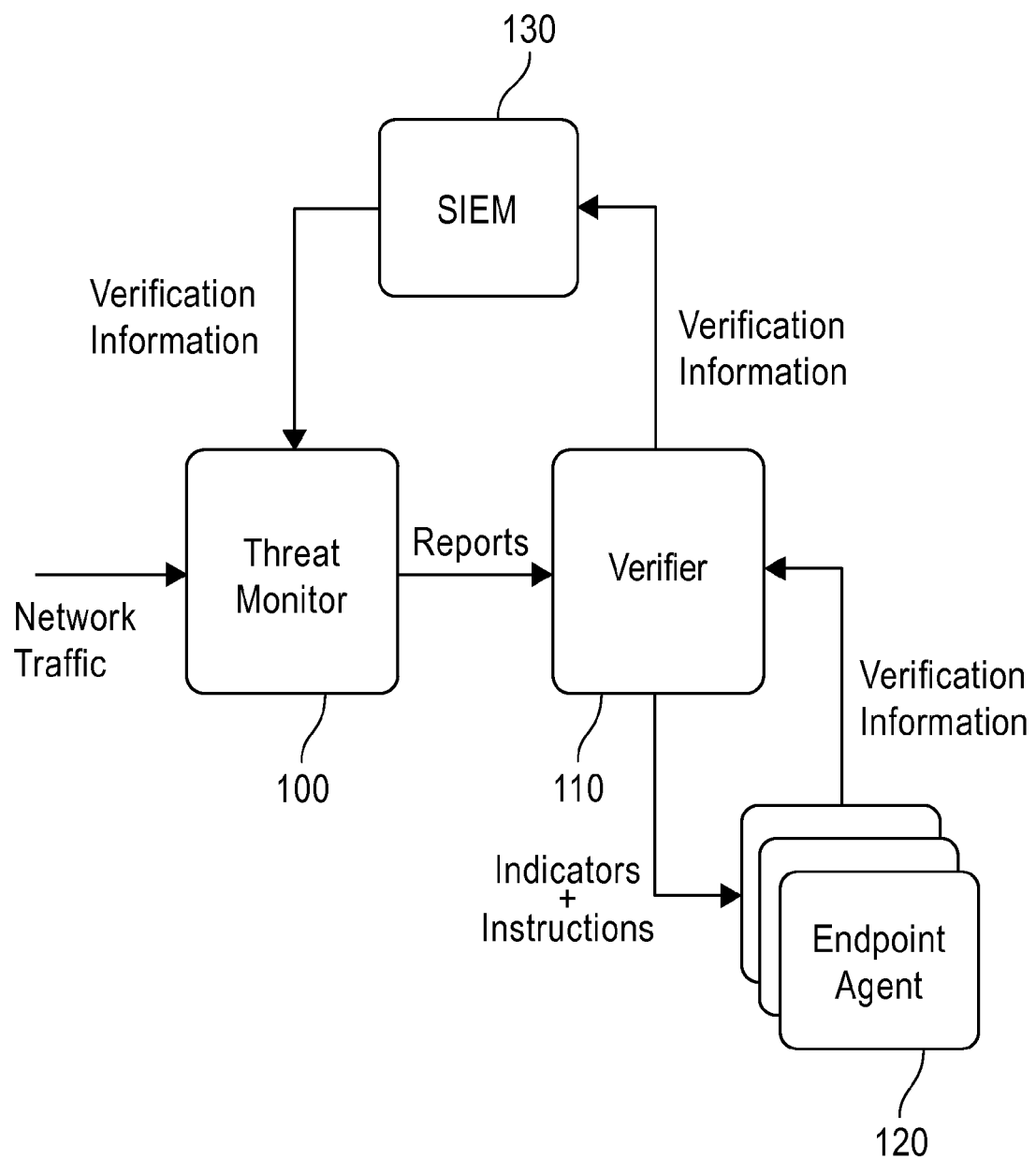
FIG. 1 is a flowchart, partially in block diagram form, illustrating an example of a system or process of the present inventive concept to identify potentially malicious software at an endpoint.

The drawing figures do not limit the present inventive concept to the specific examples disclosed and described herein. The drawings are not to scale, emphasis instead being placed upon clearly illustrating embodiments of the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not always refer to the same embodiment and are also not mutually exclusive unless so stated and/or except as will be readily apparent to those skilled in the art from the description. For example, a feature, structure, act, etc. described in one embodiment may also be included in other embodiments, but may not be included in all embodiments. Thus, the present inventive concept can include a variety of combinations and/or integrations of the embodiments described herein.

An embodiment of the present inventive concept provides a system and method that improves verification, information gathering regarding, and containment of threatening or potentially threatening executable code. Executable code is not limited to native binaries but may also include documents such as Portable Document Format (PDF) or common productivity documents such as those created with software sold under the trademarks EXCEL® and WORD™, or any artifact that may be itself executed, interpreted or otherwise processed, or that may contain code which it may cause to be executed or interpreted. Executable code may be extracted according to an embodiment of the present inventive concept at any level or by content-aware inspection of any application protocol and may use cues provided by other network traffic (such as requests to update existing components), or application-specific information (such as email headers or persistent HTTP session information). A software "module" as used herein shall refer to all or a part of a software program employed to perform a function described herein, and is not intended to imply that such code is or is not capable of independent and/or isolated functioning apart from other code nor that such code was or was not developed independently or in conjunction with other software code, nor that such code physically resides and/or is executed together with or apart from other code.

FIG. 1 illustrates an overview of a system of an embodiment of the present inventive concept with its primary subsystems. The system includes a threat monitor 100 that detects threats such as those represented by executable code, typically by analyzing traffic on a computer network and performing analysis to determine if that traffic contains executable code that may represent a threat. Network "traffic" may include any data transmitted over a network. Network traffic may include text, software, images, audio, or other digital data. Examples of network traffic include e-mail messages, instant messages, web content, or any network data that may be transmitted using a Hypertext Transfer Protocol, Hypertext Markup Language protocol, or may be transmitted in a manner suitable for display on a Web browser software application. The threat monitor 100 may copy any portion of the traffic, for example, any number of data packets from the network traffic, and may also capture metadata from the traffic. When a characteristic of the network traffic, such as a sequence of code, is identified that meets certain conditions such as those derived from intelligence known or accessible to the threat monitor 100, the threat monitor 100 may identify such a portion of the network traffic as a possible threat.

The threat monitor 100 further transmits reports for consumption, interpretation and analysis by a verifier 110. Preferably the reports are in a structured form based on a predetermined format that may be updated from time to time using updates introduced into the system externally or based on computer learning and/or adaptations to network traffic or verification information collected by the system over time. The verifier 110 verifies reports provided by the threat monitor. It does so in part by supplying endpoint agents 120 installed at, or at least operable to access the memory or operating system of, endpoints (as described in more detail below) with threat indicators and instructions. Each endpoint may be referred to as a "node," and the endpoint agents 120 enable the evaluation of such indicators and execution of such instructions, relying on information regarding historical system state and information gathered in response to such indicators and instructions to determine if a threat is present and, potentially, whether the threat (often, executable code) has executed or otherwise been realized. The endpoint agents 120 are further operable to communicate threat verification information (including, for example audit data and hit data, and other contextual data and perhaps the indicators and instructions themselves as well) collected and/or generated in connection with the instructions and indicators back to the verifier 110.

"Indicators" include information or functions, such as logical test instructions, which if compared against audit data or relied on to configure or conduct an audit may indicate that an endpoint or other component of a system may be compromised. Examples of indicators include descriptions of files with a specific hash sum or database entries which match a particular regular expression (example: "a file exists named 'evil.exe' that was created after 3 p.m. yesterday"). Indicators may relate to any specific type or subset of information regarding system state (including but not limited to: contents of memory, contents of storage, names of files, contents of files including both byte content and the result of any analysis such as hash sums calculated from those bytes, and contents of operating system abstractions such as a system registry). Indicators and instructions, such as logical test instructions, may be stored and transmitted in an interchange format such as XML or JSON, and may describe logical operations and predicates which may be evaluated automatically by an appropriately configured software program. A common format for such an indicator is OpenIOC, but this is not the only format capable of use in accordance with the present inventive concept.

The system of FIG. 1 may include a security information and event manager or SIEM 130 configured to consume information such as, but not limited to, verification information or other information related to one or more endpoints, and correlate the information so that a user or machine may take action based on the information. The SIEM 130 may be embodied in software, hardware, or a combination thereof. The SIEM 130 may be configured to perform one or more security management functions such as, but not limited to, gathering and/or aggregating security-related information from one or more sources. In this manner, the SIEM 130 provides improved analysis and/or control of the information. The SIEM 130 of the present inventive concept is not limited to management of security information and/or events. Indeed, it is foreseen that the SIEM 130 may include additional functionality, e.g., functionality related to identifying, processing, and/or managing security related information and/or events. It is also foreseen that one or more functions of the SIEM 130 may be handled by one or more modules other than the SIEM 130, for instance, by an appropriately-configured verifier 110 if the SIEM 130 is unavailable. It is also foreseen that the present inventive concept may include one or more modules in lieu of or in addition to the SIEM 130. For instance, a security information management (SIM) module, a security event management (SEM) module, and/or the like may be used in lieu of or in addition to the SIEM 130.

The SIEM 130 according to embodiments of the present inventive concept may optionally convey threat verification information back to the threat monitor 100. The SIEM 130 may correlate verification information with intelligence gathered from many sources, including prior intelligence gathered from the endpoint agent 120, intelligence gathered from other endpoint(s), and/or with definitions or against rules or tests stored in memory accessible to the SIEM and optionally updated from time to time via a communication network.

Figure 2:
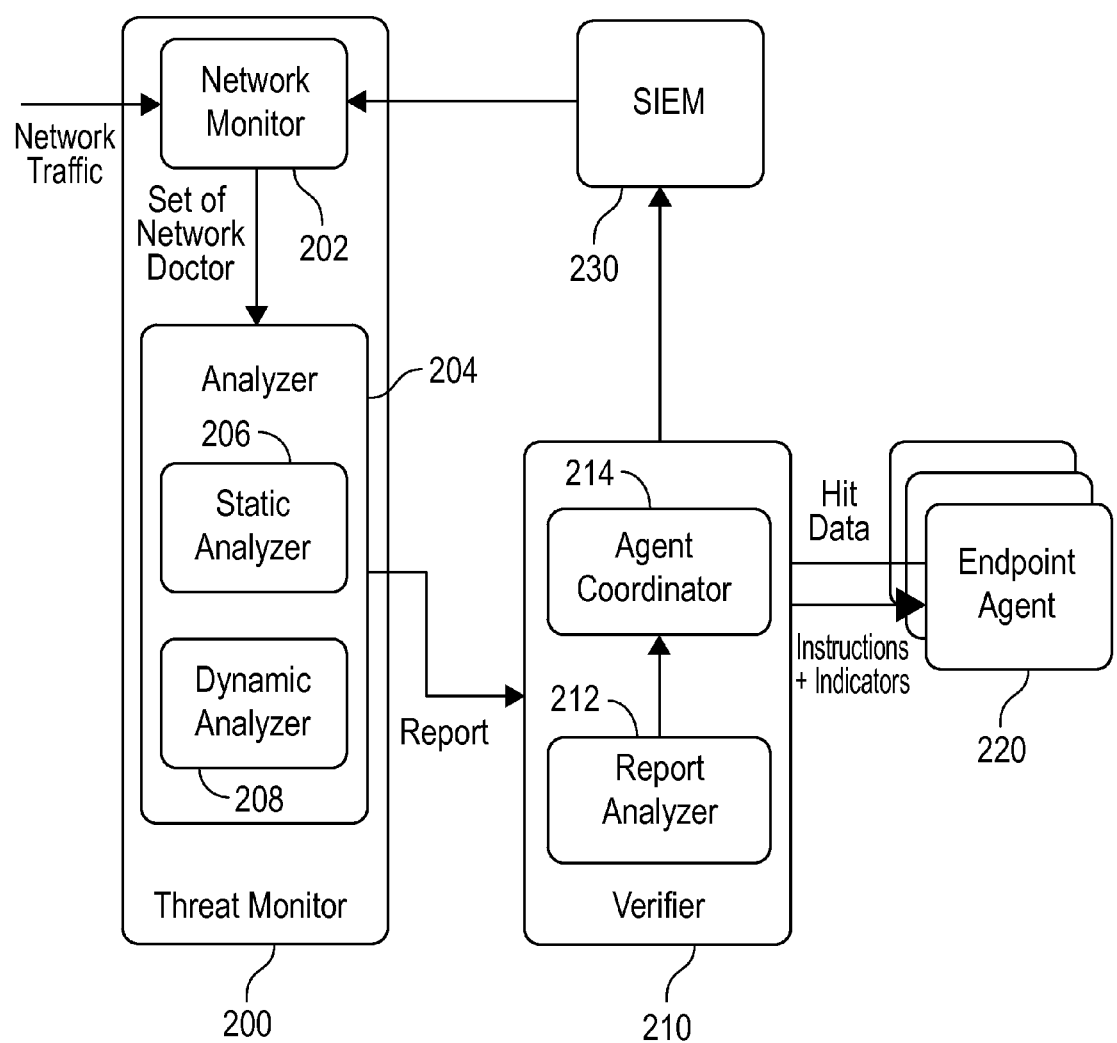
FIG. 2 is a flowchart, partially in block diagram form, illustrating an example of a system or process of the present inventive concept to identify potentially malicious software at an endpoint.

Turning now to FIG. 2, the verifier 210 of an embodiment of the present inventive concept is illustrated in additional detail along with a breakout of components of the threat monitor 200. A threat monitor 200 typically consists of components such as a network monitor 202 and one or more analyzers 204. Those components are illustrated separately in FIG. 2 because they may not always be implemented together in the same subsystem or component. However, they may be integrated in certain embodiments. A network monitor 202 monitors network traffic to identify and extract data such as executable code from the network, typically as it travels across the network. A grouping of such network data may be referred to herein as a "set." Any means to identify and extract executable code may be used in addition to raw network monitoring. The network monitor 202 sends the executable code it captures to an analyzer 204 for analysis.

The analyzer 204 gathers information about the set of network data through a variety of methods. For example, the analyzer 204 may employ a static analyzer 206 to gather information about executable code without executing it (such as by measuring its size and calculating a hash from the bytes of which it is comprised). The static analyzer 206 then adds information resulting from its analysis to a report. The analyzer 204 may further or alternatively employ or comprise a dynamic analyzer 208 to completely or partially execute the executable code and monitor its behavior, such as in a sandboxed and/or instrumented environment. The dynamic analyzer 208 may then add information resulting from its analysis to a report. A report's information may include what changes executing code attempts to make or makes to the environment where it executes, operations executing code attempts which may not change the environment, such as network connections or DNS lookups, and any other operations or behaviors of executing code that are detectable in the environment. The analyzer 204 packages the reports from its analysis mechanisms, such as the two discussed hereinabove, and uses configuration and other information (such as historical or human intelligence) to attach a designation of the type and degree of threat to a computer or user's security posed by items or network data referenced in the report.

Reports are transmitted to the verifier 210 which may consist of one or more components of software executing on one or more platforms and/or devices. The reports are communicated to a report analyzer 212 of the verifier 210. The report analyzer 212 may accept those reports via a network connection so they may be acted upon in a timely manner after detection and/or analysis. The report analyzer 212 analyzes a report and yields intelligence, including indicators and instructions (as well as associations between those indicators and the respective items in the report(s) giving rise to them, and information added to the instructions and/or indicators that specifies one or more hosts or sets of hosts or endpoints which should specifically be contacted to verify a described threat) and communicates these to an agent coordinator 214 of the verifier 210. The report analyzer 212 may apply selection methodologies based on configuration or other analysis results to refine reports into, or select indicators and instructions that, represent a higher-fidelity representation (high-fidelity indicators) of the threat than would otherwise have been apparent from analysis of all characteristics described in the report. These may provide stronger evidence that a given threat has been received by a device or user such as an endpoint (i.e., the threat "persisted") and further help determine whether the executable code associated with the threat has been executed or "detonated" on the device.

The agent coordinator 214 interprets the intelligence, including any indicators or instructions, performs any further configuring or selection/generation of indicators and instructions that may be needed before further transmission, selects an endpoint agent(s) 220 to perform processing of the instructions and indicators, then communicates that processing work to such endpoint agent(s) 220. For example, the work for endpoint agent 220 to perform may consist of indicators and instructions on how to test those indicators, including specific configurations for individual methods to acquire relevant endpoint system state information. The agent coordinator 214 may include a system of one or more devices running one or more pieces of software that can track, enroll, uniquely identify, and communicate with endpoint agents 220, as well as assign work and configuration to be executed by specific endpoint agents 220 and retrieve the result of that work. Communications with endpoint agents 220 may occur directly or indirectly, via cryptographically and secure intermediate locations. Results of work or other threat-related information received from endpoint agents 220, or "verification information," are received as payloads that may be of an arbitrary size, and such data may be stored and forwarded in order to successfully reach an endpoint agent 220 or a component of the agent coordinator 214. If such data is stored, the data may be stored in such a way that an intermediary would not immediately be able to inspect the transmitted data, such as using a cryptographically-sound PKI method.

An endpoint agent 220 tests endpoint system state and examines memory, including by performing audits thereof and/or accessing historical information about the system or endpoint, for example to determine if an indicator it receives is satisfied. The endpoint agent 220 is installed on, or at least operable to access the memory or operating system of, one or more endpoint devices or nodes and is configured with a means to request processing work from a configured agent manager and/or agent coordinator 214, to process the work (i.e., the instructions and indicators), and provide the result of work, including verification information, when the work is in progress and/or is complete.

The endpoint agent 220 audits one or more nodes or endpoints on the network, particularly looking for specific instances of any number of "high-fidelity indicators" in current or recorded system state and memory. It may receive work from the agent coordinator 214 in the form of indicators and instructions via a cryptographically secure channel and mechanism which may entail polling, contacting intermediate devices or any other means. The various components of the endpoint agent 220 may employ one or more methods to continuously sample and record system state information so that the system is capable of "looking back in time", so to speak, for example to determine if any part of the endpoint's system state matches an indicator and also whether some previous system state matched an indicator and at what point in time it did so. Preferably, the endpoint agent 220 and its components will operate, and more specifically will perform monitoring and recording functions, in a manner that is unlikely to cause immediate loss of forensic viability of the system, such as by pre-allocating storage such that data written to disk does not overwrite disk sectors which may contain information relevant to an investigation. The workflow should be controlled to prevent unintentional operation of features or components which may negatively affect the endpoint.

The endpoint agent 220 may still further receive work in the form of instructions to update itself and/or extend its functionality by installing or uninstalling components or other software, for example instructions to install additional software on the endpoint which can make changes to system state or behavior such that malicious software may continue to operate but may not affect the endpoint and surrounding systems.

This endpoint agent 220 may be configured so that it can post the results of completed work back, including verification information, such that the agent coordinator 214 can retrieve it and utilize it. The result of an endpoint agent's 214 completed work may include hit data including information from indicators and the results of processing same, audit methods, original intelligence sources, audit data, audit results and ambient system state. The endpoint agent 220 may be configured to report back the result of the work via a cryptographically secure channel (as above, which may entail multiple devices or connectivity mechanisms), including data regarding hits or "hit data". "Hit data" is information that at least partially satisfies an indicator and/or is returned as a result of executing an instruction, i.e., that creates a "hit," and may include any number of the following: the indicator which hit on the system state or memory, a partial or complete sample of the relevant system state or memory, a time stamp associated with the sample that generated a hit, ambient data not directly associated with the indicator but that helps to identify the system or provide data not directly requested but which is available to the mechanism (for example, the host name, logged-in users, or the current contents of a DNS cache).

Figure 3:
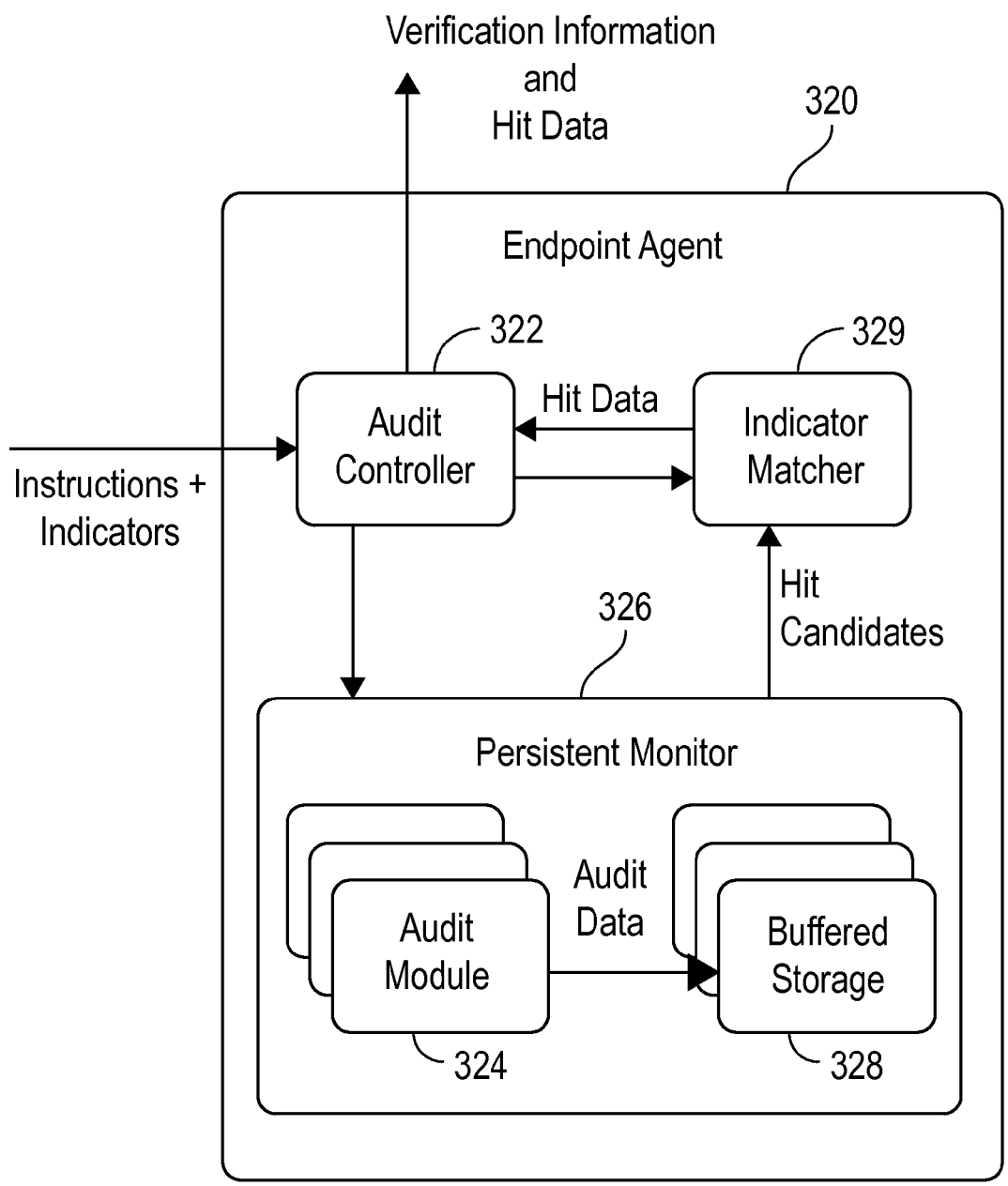
FIG. 3 is a flowchart, partially in block diagram form, illustrating an example of a system or process of the present inventive concept to perform auditing on an endpoint and produce verification information.

FIG. 3 illustrates the endpoint agent 320 in greater detail. Indicators and instructions are communicated to the endpoint agent 320 via a cryptographically secure mechanism. A component of the endpoint agent 320 is an audit controller 322, which receives such indicators and instructions. The audit controller 322 preferably controls audits of system state and memory performed by an audit module 324. In certain embodiments, the audit module 324 forms part of a persistent monitor 326 along with a buffered storage module 328, discussed in more detail below. The audit controller 322 interprets and/or packages the instructions and indicators into suitable configuration and sends to the audit module 324 for performance. The audit controller 322 also preferably controls operation of the persistent monitor 326 more broadly, including by directing its standing operations which in preferred embodiments include continuously recording system state. The audit controller 322 also, in preferred embodiments, uses indicators to configure an indicator matcher 329 component which can perform instantaneous and historical matching on system state and memory using audit data and indicators.

The persistent monitor 326 of the endpoint agent 320 monitors the operating system file system state and memory of the endpoint in preferred embodiments. For example, it may be configured to detect "any file that is created", and, if one is created, to provide audit data about that operation to the indicator matcher 329 (audit data matching any criteria set, for example a criterion set by the audit controller 322, may also be persisted in the buffered storage module 328 for later, historical matching). The persistent monitor 326 may also be configured to automatically report, directly or by way of the verifier or other system components, certain system events as or after they occur at the endpoint(s) to other components of the system, for example to the threat monitor for incorporation into or interpretation as intelligence or to the verifier or audit controller 322 for further configuration of indicators that may be active at one or more endpoint agents 320. The endpoint agent 320 may also receive indicators and instructions that are used to refine the configuration of the persistent monitor 326 (and it, in turn, may modify operation of individual audit methods), including by limiting the criteria for recording information obtained from audits. For example, further to the example described immediately above, the criteria may be changed to "any file created at or below [a certain path]", which is a narrower set of events.

The buffered storage module 328 may be configured (manually, automatically, or using an adaptive algorithm) on a per module and/or per system state category basis (such as file system, network connections, DNS lookups, etc.) so that an endpoint system state that changes often (and thus generates more audit data) may be buffered, stored, tuned, and retained differently from states with different rates of change or size of payload.

As endpoint system state changes are detected and persisted, the persistent monitor 326 may communicate hit candidates to the indicator matcher component of the endpoint agent 320. As hit candidates information is matched against configured indicators by the indicator matcher 329, the indicator matcher 329 will communicate hit data to the audit controller 322 for packaging as completed work to be augmented with any relevant system state and data, additional context, sample data and/or time stamped snapshots of the data that matched the indicator. Hit data is then communicated back to the verifier as threat verification information for further analysis and dissemination.

Returning to FIG. 2, the verifier 210 retrieves verification information, including hit data and other intelligence from the endpoint agent 220 and performs further evaluation and correlation if required to determine if such information represents a verified threat. Verification by the verifier 210 may involve contacting and receiving information from other endpoint systems and even other networks, and the verifier may utilize the SIEM 230 to make such contacts and may otherwise communicate verification information to and through the SIEM 230. Verification information may contain a set of host or endpoint identification data, hit data, and other data that might aid a detector or other information system to correlate the endpoints' state and memory with the original threat. The SIEM 230, or similar system for performing such functions, may include syslog, using a format like CEF, or may be an HTTP receiver configured to accept a REST-style payload in a structured format like XML or JSON.

The SIEM 230 or other configured system may then present the verification information to a user or automatic correlation mechanism (such as any component of the threat monitor 200) or may perform further correlations itself, such as against data from other endpoint agent(s) and taking into account the indicators and instructions leading to the verification information, or against information obtained from other threat monitoring systems. The SIEM 230 may also forward the verification information as well as any other configured or received state information on to the original network monitor 202, such that it may correlate hit data and intelligence with its original detection of a threat or potential threat and present that verified threat to the user. The verifier 210 may further send a notification and location (such as a URL) at which a complete hit data set may be retrieved via an appropriately authorized and authenticated channel.

The correlations performed by the SIEM 230, verifier, and/or threat monitor may automatically trigger, for example via the controller discussed below, additional steps of the method of the present inventive concept to verify and/or contain threat(s). For example, the controller may receive the results of such correlations, analyze them to determine the threat level presented thereby, and initiate one or more of the following steps at the endpoint agent 220 and/or other endpoint agents communicatively coupled to the controller via the communication network: (1) further investigation to verify or gather additional information regarding the threat(s), and (2) containment actions regarding the threat(s). One or more of these steps may be performed based on a threshold evaluation that may take into account high-fidelity indicators such as the source of the verification information, the possible impact of execution of the threat(s) at one or more endpoint(s), the number of times the verification information has been detected at the endpoint agent 220, and the number of times the verification information has been reported from other endpoint agents. This weighted threshold analysis may take into account, and assign varying weight to, a number of different factors indicating the threat level and/or reliability of the verification information.

The verifier 210 may further enable a properly authorized user or machine to "contain" a threat, that is to take a containment action to restrict or alter endpoints or their software in a way that affects the threat or its operation, such as by limiting network communication. The verifier 210 may also present contained or otherwise threatened endpoints to a user or machine in a manner which allows users to take action including further investigation, remediation, and optionally release of containment agents.

Figure 4:
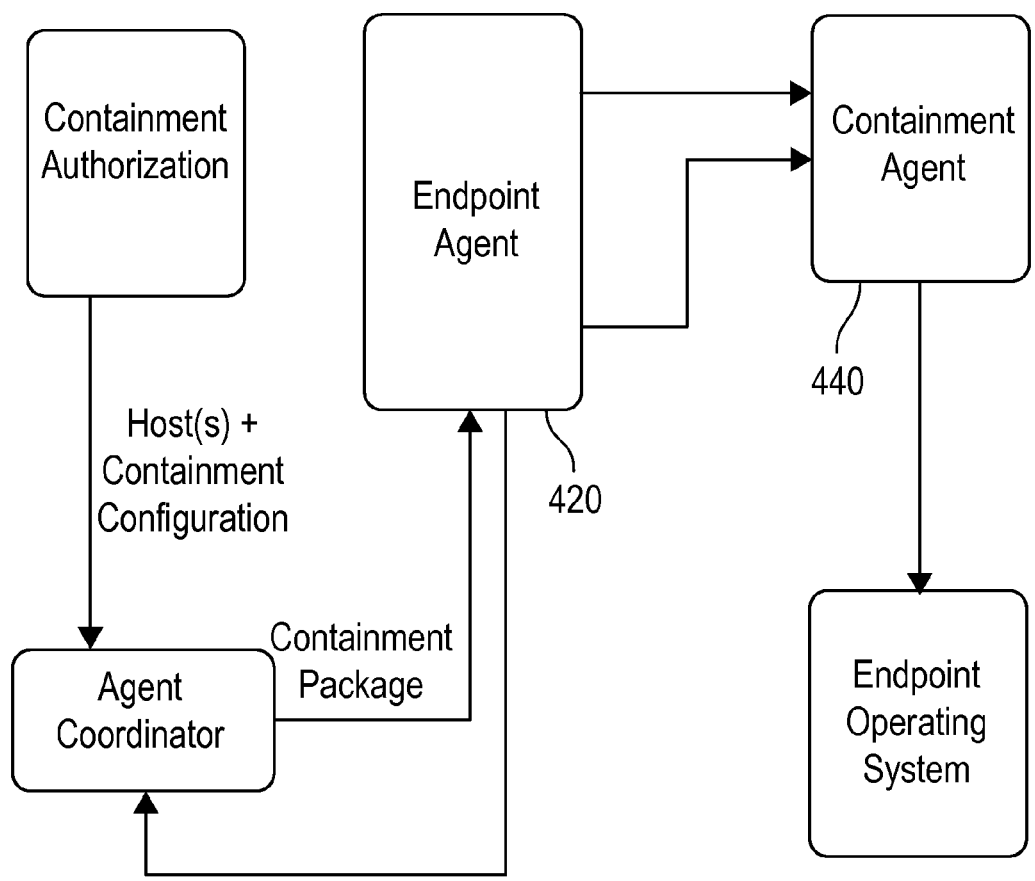
FIG. 4 is a flowchart, partially in block diagram form, illustrating an example of a system or process of the present inventive concept to perform a containment action.

FIG. 4 illustrates a containment workflow through an embodiment of the system of the present inventive concept. Initially, endpoints having endpoint agents 420 are selected for containment, and authorization of that containment is given or confirmed. A set of hosts or endpoints and a containment configuration information are selected and communicated to an agent coordinator 414. The agent coordinator 414 selects or generates and configures an appropriate containment package, which may contain configuration information, may describe a means to download executable code, may itself contain executable code, or any combination of these. An endpoint agent 420 receives the containment package and performs the steps it describes or instructs, either performing the containment actions itself or ultimately resulting in additional executable code being made available to the endpoint agent 420. If additional executable code is contained or described in the containment package, the endpoint agent 420 installs that executable code, or the "containment agent" 440, on the local host such that it is configured to affect system configuration and state.

The endpoint agent 420 may also configure the containment agent 440 using configuration data extracted from the containment package or otherwise determined or obtained by endpoint agent 420. The containment agent 440 makes changes to the system state and/or configuration, for example so that a threat on that endpoint may be contained, and notifies the endpoint agent 420 when the containment actions and results thereof are complete. The containment agent 440 can be instructed via a cryptographically secure channel and mechanism to perform actions intended to affect the ability of malicious software to function, communicate, send or receive instructions, or affect the system in other ways that "contain" the endpoint threat. It can also perform the above without affecting the endpoint's ability to communicate with the system coordinating its actions. Finally, the containment agent 440 can be instructed in a similar manner to cease the "contain" operation or containment actions in whole or in part, up to and including uninstalling the containment agent 440 itself, or requiring that it be deployed via the mechanism described above in order to perform further containment operations. The endpoint agent 420 communicates containment status and other host context information back to the agent coordinator 414 such that it can communicate information about the containment operation to a user or machine for display or other action.

The previous description of various embodiments of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with embodiments of the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Furthermore, the modules, agents, and other units described herein for performing steps of the present inventive concept may be executed by one processor, or by a plurality of processors housed within one computing device or a plurality of devices, communicatively coupled to a communication network. The processor(s) may represent one or more general-purpose processors such as a microprocessor, a central processing unit, or the like. More particularly, the processor may be a complex instruction set computing microprocessor, reduced instruction set computing microprocessor, very long instruction word microprocessor, or processor implementing other instruction sets or processors implementing a combination of instruction sets. The processor(s) may also be one or more special-purpose processors such as an application specific integrated circuit, a field programmable gate array, a digital signal processor, a network processor, a graphics processor, a network processor, a communications processor, a cryptographic processor, a co-processor, an embedded processor, or any other type of logic capable of processing instructions. The processor(s) is configured to execute instructions for performing the operations and steps discussed herein.

The modules, agents and other units described herein for performing steps of the present inventive concept may also be stored in and accessed from one or a plurality of memory locations for storing software program code (including application programs) and data structures associated with the embodiments described herein and that are addressable by the processor(s) and the communication network. The communication network may include a public computer network such as the Internet, in which case an optional firewall may be interposed between the communication network and one or more processors executing the modules, agents, and other units described herein, and/or between the communication network and the endpoints described herein. The communication network may alternatively be a private computer network such as a wireless telecommunication network, wide area network, or local area network, or a combination of networks.

Further, one or more of the modules, agents and other units described herein for performing steps of the present inventive concept may be stored and/or executed at the endpoint(s) of the present inventive concept. For example, the threat monitor may be stored on memory located at the endpoint(s), or be executed on a processor(s) at the endpoint(s), together with the endpoint agent(s) in one embodiment, without deviating from the spirit of the present inventive concept. Such units are communicatively coupled to the endpoint(s) via the communication network. A further example is where one or more of the modules, agents and other units described herein for performing steps of the present inventive concept, such as the threat monitor and the verifier's agent coordinator, are contained within middleware communicatively coupled to the communication network.

One or more of the modules, agents and other units described herein for performing steps of the present inventive concept may be controlled by a controller (data processing circuitry) communicatively coupled to a storage device and configured to manage and/or control one or more of such units. The controller may further provide updates to such units' software programs, and may be incorporated into one or more, or into all, of them, depending on the deployment.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A computerized method to identify potentially malicious code at an endpoint in a network, the method comprising the steps of:
   via a threat monitor:
      monitoring network data,
      extracting at least one set of network data, and
      processing the at least one set of network data to generate a report;
   via a verifier including an agent coordinator, issuing at least one of (i) instructions, and (ii) indicators to an endpoint agent based on the report; and
   processing, via the endpoint agent, the at least one of (i) instructions, and (ii) indicators to generate verification information,
   wherein the verification information is processed via the verifier by comparing the verification information to at least one of (a) data obtained from another endpoint, and (b) data obtained from a security information and event management module (SIEM).

2. The computerized method according to claim 1, wherein the verification information includes audit data.

3. The computerized method according to claim 2, wherein the audit data includes hit data.

4. The computerized method according to claim 1, further comprising the step of:
   providing the verification information to the verifier.

5. The computerized method according to claim 4, further comprising the step of:
   processing, via the verifier, the verification information to determine whether it indicates a verified threat.

6. The computerized method according to claim 1, further comprising the step of:
   changing the configuration of the threat monitor based on the verification information.

7. The computerized method according to claim 1, wherein the report includes structured threat intelligence.

8. The computerized method according to claim 1, further comprising the step of:
   providing the verification information to at least one of (a) the verifier, (b) the SIEM, and (c) the threat monitor.

9. The computerized method according to claim 1, wherein the processing of the at least one set of network data is performed by an analyzer of the threat monitor, the analyzer includes software executed by a hardware processor of the endpoint.

10. The computerized method according to claim 9, wherein the analyzer is a static analyzer.

11. The computerized method according to claim 9, wherein the analyzer is a dynamic analyzer.

12. The computerized method according to claim 1, further comprising the step of:
    processing the report via a report analyzer of the verifier to generate the at least one of (i) instructions and (ii) indicators.

13. The computerized method according to claim 1, wherein the processing of the at least one of (i) instructions and (ii) indicators is performed via an audit module that generates audit data, the audit module being software executed by a hardware processor of the endpoint.

14. The computerized method according to claim 13, further comprising the step of:
    storing the audit data in a buffered storage module.

15. The computerized method according to claim 13, wherein the audit data is processed by an indicator matcher to produce the verification information.

16. The computerized method according to claim 1, further comprising the step of:
    performing a containment action on the endpoint via the endpoint agent based on the verification information.

17. The computerized method according to claim 16, wherein the containment action is taken by a containment agent of the endpoint agent.

18. The computerized method according to claim 17, wherein the containment agent is installed on the endpoint pursuant to instructions contained in a containment package configured by the agent coordinator.

19. A system operable to identify potentially malicious code on an endpoint in a network, the system comprising:
    a threat monitor operable to monitor network data, to extract at least one set of network data, and to process the at least one set of network data to generate a report; and
    a verifier including an agent coordinator operable to issue at least one of (i) instructions and (ii) indicators to an endpoint agent based on the report;
    wherein,
       the endpoint agent is operable to process the at least one of (i) instructions and (ii) indicators to generate verification information, and
       the endpoint agent includes a containment agent operable to perform a containment action based on the verification information.

20. The system according to claim 19, wherein the containment agent is installed on the endpoint pursuant to instructions contained in a containment package configured by the agent coordinator based on the verification information.

21. The system according to claim 19, wherein the verifier is operable to process the verification information to determine whether it indicates a verified threat.

22. The system according to claim 19,
wherein,
the report includes structured threat intelligence, and
the verifier is operable to process the structured threat intelligence to issue the at least one of (i) instructions and (ii) indicators.

23. The system according to claim 19, wherein the threat monitor includes an analyzer configured to process the at least one set of network data, the analyzer includes software executed by a hardware processor of the endpoint.

24. The system according to claim 23, wherein the analyzer is a static analyzer.

25. The system according to claim 23, wherein the analyzer is a dynamic analyzer.

26. The system according to claim 19, wherein the verifier includes a report analyzer operable to generate the at least one of (i) instructions and (ii) indicators.

27. The system according to claim 19, wherein the endpoint agent includes an audit module operable to process the at least one of (i) instructions and (ii) indicators to generate audit data, the audit module being software executed by a hardware processor of the endpoint.

28. The system according to claim 27, wherein the endpoint agent includes a buffered storage module operable to store the audit data.

29. The system according to claim 27, wherein the endpoint agent includes an indicator matcher operable to process audit data to produce the verification information.

30. A system operable to identify potentially malicious code on an endpoint in a network, the system comprising:
a controller configured to manage,
a threat monitor operable to monitor network data, to extract at least one set of network data, and to process the at least one set of network data to generate a report, and
a verifier including an agent coordinator operable to issue at least one of (i) instructions and (ii) indicators to an endpoint agent based on the report,
wherein,
the endpoint agent is operable to process the at least one of (i) instructions and (ii) indicators to generate verification information, and
the verifier includes a report analyzer operable to generate the at least one of (i) instructions and (ii) indicators.

31. The system according to claim 30, further comprising: an agent coordinator of the verifier,
wherein,
at least one of (i) the threat monitor and (ii) the agent coordinator is stored at a memory location on the endpoint.

32. The system according to claim 30, further comprising: an agent coordinator of the verifier,
wherein,
at least one of (i) the threat monitor and (ii) the agent coordinator is stored at a middleware layer communicatively coupled to a communication network.

33. The system according to claim 30, wherein the verifier is operable to process the verification information to determine whether the verification information indicates a verified threat associated with the endpoint.

34. The system according to claim 30,
wherein,
the report includes structured threat intelligence, and
the verifier is operable to process the structured threat intelligence to issue the at least one of (i) instructions and (ii) indicators.

35. The system according to claim 30, wherein the threat monitor includes an analyzer configured to process the at least one set of network data, the analyzer includes software executed by a hardware processor of the endpoint.

36. The system according to claim 35, wherein the analyzer is a static analyzer.

37. The system according to claim 35, wherein the analyzer is a dynamic analyzer.

38. The system according to claim 30,
wherein,
the controller is communicatively coupled to the threat monitor and the verifier via a communication network, and
the system further includes a SIEM managed by the controller that correlates verification information with intelligence gathered from at least one of (i) the endpoint agent, (ii) other endpoints, and (iii) other threat monitoring systems.

39. The system according to claim 30, wherein the endpoint agent includes an audit module operable to process the at least one of (i) instructions and (ii) indicators to generate audit data, the audit module being software executed by a hardware processor of the endpoint.

40. The system according to claim 39, wherein the endpoint agent includes a buffered storage module operable to store the audit data.

41. The system according to claim 39, wherein the endpoint agent includes an indicator matcher operable to process audit data to produce the verification information.

42. The system according to claim 30, wherein the endpoint agent includes a containment agent operable to perform a containment action based on the verification information.

43. The system according to claim 42, wherein the containment agent is installed on the endpoint pursuant to instructions contained in a containment package configured by the agent coordinator based on the verification information.

* * * * *